(12) United States Patent
Vernal et al.

(10) Patent No.: US 9,754,125 B2
(45) Date of Patent: Sep. 5, 2017

(54) DYNAMIC ENFORCEMENT OF PRIVACY SETTINGS BY A SOCIAL NETWORKING SYSTEM ON INFORMATION SHARED WITH AN EXTERNAL SYSTEM

(71) Applicant: Facebook, Inc., Menlo Park, CA (US)

(72) Inventors: Michael Steven Vernal, San Francisco, CA (US); Wei Zhu, Cupertino, CA (US); James M. Leszczenski, Walnut, CA (US); Joshua E. Elman, Palo Alto, CA (US); David Brookes Morin, San Francisco, CA (US); Charles Duplain Cheever, Palo Alto, CA (US); Ruchi Sanghvi, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 441 days.

(21) Appl. No.: 14/581,786

(22) Filed: Dec. 23, 2014

(65) Prior Publication Data

US 2015/0113590 A1 Apr. 23, 2015

Related U.S. Application Data

(63) Continuation of application No. 14/266,300, filed on Apr. 30, 2014, now Pat. No. 8,955,145, which is a continuation of application No. 12/508,523, filed on Jul. 23, 2009, now Pat. No. 8,752,186.

(51) Int. Cl.
*G06F 21/62* (2013.01)
*H04L 29/06* (2006.01)
*H04L 29/08* (2006.01)

(52) U.S. Cl.
CPC ........ *G06F 21/6245* (2013.01); *H04L 63/102* (2013.01); *H04L 63/20* (2013.01); *H04L 67/306* (2013.01)

(58) Field of Classification Search
CPC ... G06F 21/6245; H04L 63/102; H04L 63/20; H04L 67/306
See application file for complete search history.

(56) References Cited

U.S. PATENT DOCUMENTS 5,835,601 A * 11/1998 Shimbo .................. G06F 17/24
380/29
6,324,569 B1 * 11/2001 Ogilvie ................ G06Q 10/107
709/206

(Continued)

*Primary Examiner* — Darren B Schwartz
(74) *Attorney, Agent, or Firm* — Fenwick & West LLP

(57) ABSTRACT

An external system (such as a website) that interacts with users communicates with a social networking system to access information about the users, who may also be users of the social networking system. If a privacy setting is changed in the social networking system, and the change applies to information that has been shared with an external system, the change is enforced at the external system. For example, the external system may be notified that the information is invalid and must be deleted, or the external system may periodically request the information so that changes to the privacy settings are eventually experienced at the external systems. When an external system again needs the information, whether expired naturally or actively invalidated by the social network, the external system sends a new request for the information, which is subject to the (possibly revised) privacy settings.

20 Claims, 4 Drawing Sheets

(56) References Cited

U.S. PATENT DOCUMENTS

| | | | | |
|---|---|---|---|---|
| 6,711,608 B1* | 3/2004 | Ogilvie | ............... | G06Q 10/107 709/202 |
| 7,356,564 B2* | 4/2008 | Hartselle | .............. | G06Q 10/107 370/466 |
| 7,359,722 B2* | 4/2008 | Kim | .................. | H04M 1/72552 379/142.15 |
| 2002/0016775 A1* | 2/2002 | Nakagawa | .............. | G06F 21/10 705/52 |
| 2003/0131063 A1* | 7/2003 | Breck | .................... | H04L 51/12 709/206 |
| 2005/0097170 A1* | 5/2005 | Zhu | ...................... | G06Q 10/107 709/204 |
| 2007/0230374 A1* | 10/2007 | Altberg | ................ | H04M 7/006 370/271 |
| 2008/0255989 A1* | 10/2008 | Altberg | ................ | G06Q 20/102 705/40 |
| 2009/0143051 A1* | 6/2009 | Kim | ...................... | G06Q 10/10 455/414.2 |
| 2009/0210502 A1* | 8/2009 | Ocampo | ............ | H04L 12/5895 709/206 |

* cited by examiner

DYNAMIC ENFORCEMENT OF PRIVACY SETTINGS BY A SOCIAL NETWORKING SYSTEM ON INFORMATION SHARED WITH AN EXTERNAL SYSTEM

CROSS REFERENCE TO RELATED APPLICATIONS

This application is a continuation of U.S. application Ser. No. 14/266,300, filed Apr. 30, 2014, which is a continuation of U.S. application Ser. No. 12/508,523, filed Jul. 23, 2009, now issued as U.S. Pat. No. 8,752,186, each of which is incorporated by reference herein in its entirety.

FIELD OF THE INVENTION

This invention relates to social networking and in particular to using information from a social network in an external system outside of the social network.

BACKGROUND

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access to particular information on the system, also provide information that can be stored in the user's record. The system may then use information provided by the user and information gathered about the user, to constantly customize interactions of the system with the user. For example, a website selling books may keep track of a users previous purchases and provide the user with information on related books during subsequent interactions with the system. Information in a user's profile may also be used by the system to target advertisements that are of interest to the user. Using information collected from and about users results in a system that is more efficient and beneficial for both the user and the system.

However, prior systems, including websites, lack the ability to use information associated with a user's social connections or activities to customize and/or personalize the user's experience while using the system. Access to information about the user's social interactions and/or the activities of a user's social connections (e.g. friends, family, co-workers, etc.) improves the user's experience while using the system and increases the chance that the user will use the system in the future. For example, users visiting a website that sells books may be interested in books that their social connections have looked at, book reviews or comments provided by their social connections, and other social information that might inform their purchases of book from the website. The system itself also benefits, because it can leverage information about the user and the user's social connections to more accurately determine what a user might be interested in. Such a system can use social information to customize a user's experience and target products, services and/or advertisements to the user.

Typical systems do not possess sufficient information about a user's social connections to customize the user's experience or effectively target advertising to the user. Assembling enough information about a user's social connections for these purposes requires a system to interact with a large number of users over an extended period of time. The majority of websites will not have the resources, expertise, or user base required to build and maintain a system of the scale necessary to capture, organize and maintain a sufficient amount of information about users' social connections and their activities. Thus, users of these systems will have an inferior experience, and the customization/personalization provided by these sites is unlikely to accurately take into account or reflect information about the user's social connections and their activities.

A social networking system may establish privacy settings to allow users to decide who can access information associated with the user within the social networking system. Existing social networking systems enforce these privacy settings to control how information is used within the social networking system, but do not provide for enforcement of privacy settings outside the social networking system. A user who is not allowed to access particular information associated with another user within the social networking system should not be allowed to see the same information outside of the social networking system. When social network information is made available to external systems outside the social networking service, there are no existing techniques for enforcing the privacy settings established within the social networking service, outside that system on external systems. This is an even more difficult problem to resolve where privacy settings on the social networking system may be changed over time.

SUMMARY

To enforce privacy settings, which may change over time, embodiments of a social networking system maintain information related to actions of its users, where this information may be accessed and used by external systems. The social networking system enforces privacy settings that determine accessibility to information within the social networking system, as well as outside the social networking service. The privacy settings are enforced outside of the social networking system in the external systems. Embodiments of the invention propagate dynamic changes to the privacy settings within the social networking system to the external systems.

An embodiment presents a computer implemented method for sharing social network information with an external system subject to dynamic privacy settings. The social networking system maintains privacy settings containing rules for sharing social network information. A request for information associated with a user of the social networking system is received from an external system. A response to the request is determined and social network information is transmitted to the external system with the associated privacy settings for that information. In an embodiment, the response to the request comprises a subset of the requested information determined based on the privacy settings. When privacy settings are updated affecting one or more of the rules for sharing of social network information, the updates to the privacy settings are enforced in the external system by communications between the social networking system and the external system. In an embodiment, the communication is a message from the social networking system to the external system requesting the external system to cease using the information obtained in the previously transmitted response. In another embodiment, the social networking system and the external system have a previous agreement that the external system will use social network information for no more than a predetermined time period after receiving the social network information. In such an embodiment, the external system sends a request to the social networking system for updated information associated with the user when social network information is invalidated after the predetermined interval of time.

Another embodiment presents a computer implemented method for an external system to use social network information shared by a social networking system subject to dynamic privacy settings. An external system interacts with a user of the social networking service. If the external system wants social network information associated with the user of the social networking system, the external system sends a request to the social networking system. The external system's use of the information is governed by the privacy settings associated with the information it receives. If privacy settings are updated in the social networking system, the external system receives a communication from the social networking system. The information that has been received from the social networking system is then used in accordance with the updated privacy settings. In one embodiment, the communication received from the social networking system is a request to the external system to cease using the information provided by the social networking system. In another embodiment, the social networking system and the external system have previously agreed that the external system will use social network information for no more than a predetermined time period after it is received.

The features and advantages described in this summary and the following detailed description are not all-inclusive. Many additional features and advantages will be apparent to one of ordinary skill in the art in view of the drawings, specification, and claims hereof.

Figure 1:
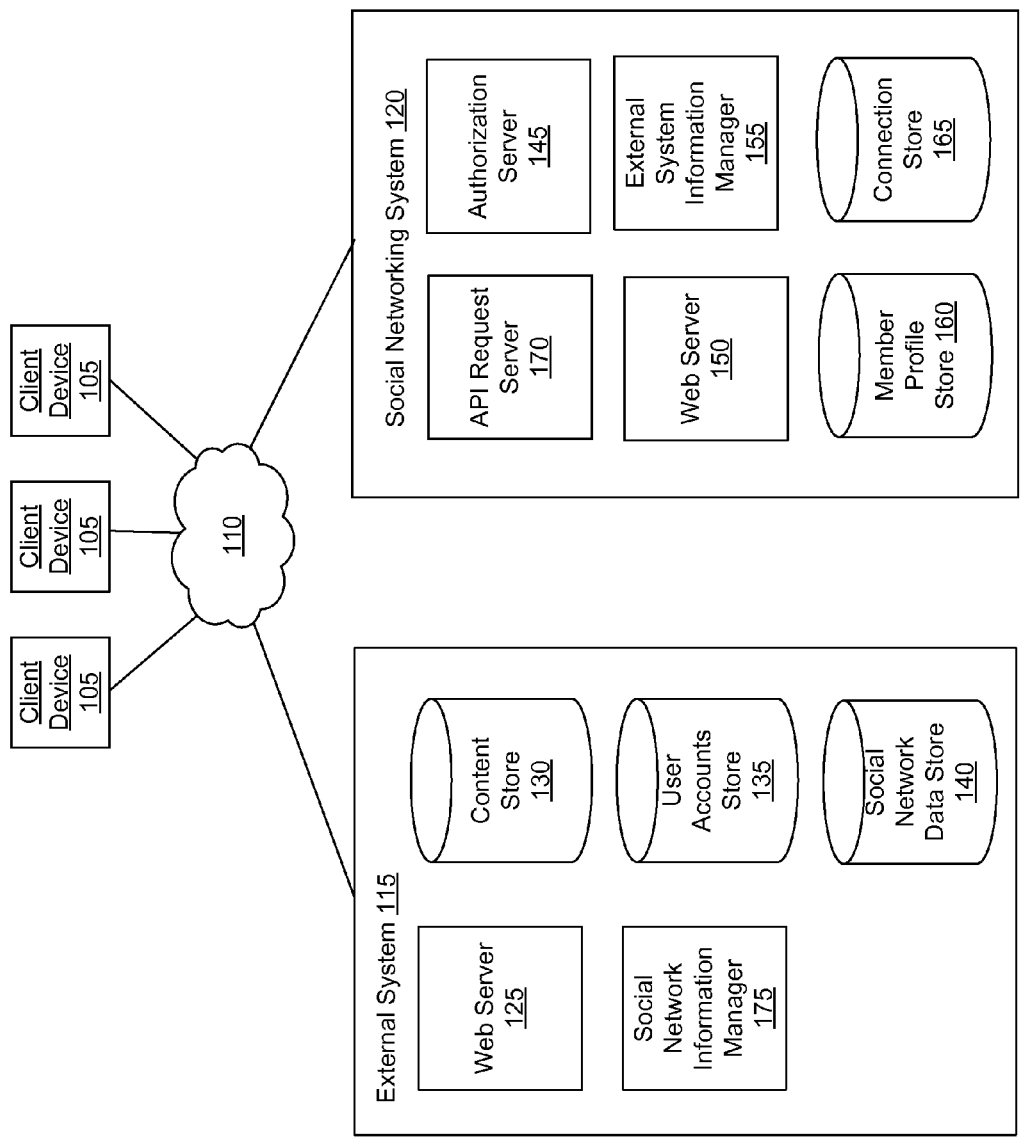
FIG. 1 is high-level diagram illustrating how an external system can interact with a social networking system and client devices, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

External System Accessing Information from Social Network

A social networking system offers its users the ability to communicate and interact with other users of the social networking system. Users join the social networking system and then add connections to a number of other users to whom they desire to be connected. As used herein, the term "connection" refers to any other user (whether an individual or other entity) of the social networking system to whom a user has formed a connection, association, or relationship via the social networking system (connections may sometimes also be referred to as "friends"). Connections may be added explicitly by a user or automatically created by the social networking system based on common characteristics of the users (e.g., users who are alumni of the same educational institution). Connections in social networks can be one or two-way connections. For example, if Bob and Joe are both users and connected to each other in the website, Bob and Joe have a two-way connection. If Bob is interested in learning more information about Joe, but there is not a reciprocal connection, a one-way connection may be formed with Bob being connected to Joe, but Joe not being connected to Bob. The connection between users may be a direct connection; however, some embodiments of a social network allow the connection to be indirect via one or more levels of connections. The social networking system keeps a record of information for each user and the connections among the users. The record of users and their connections in the social networking system may be called a "social graph."

Systems outside of the social networking system, called external systems, can access information available in the social networking system. Users of the external system can be users of a social networking system. The external system can access information from the social networking system using, for example, an Application Programming Interface (API) provided by or associated with the social networking system. The external system may use the information obtained from the social networking system for various purposes. A social networking system may interact with several external systems and information associated with a user of the social networking system can be fetched by or provided to multiple external systems.

The external system may store the information obtained from the social networking system to avoid sending a request to the social networking system repeatedly for the same information within a short interval of time. Privacy settings of the users may be enforced both by the social networking system when it responds to a request from the external system, and/or by the external system. In an embodiment, the social networking system enforces the privacy settings of the users when it responds to requests for information by providing the appropriate subset of the information in response. For example, the privacy settings of user A can specify that a profile image of user A is not accessible to user B even though users A and B are connected. If an external system requests profile images of friends of user B, the profile image of user A is not provided in the response. In another embodiment, the social networking system sends the requested information along with information about the privacy settings for that information, and the external system agrees or is required to enforce the privacy settings when using the information. For example, in the above example, the profile image of the user A is sent along with the privacy settings of user A for the profile image in response to the external system requesting profile images of friends of user B. The external system analyzes the privacy settings of user A and determines not to display the profile image of user A to user B in accordance with those privacy settings.

In some embodiments, the external system agrees to invalidate the social network information stored by the external system after a predetermined interval of time, for example, after 24 hours. If the external system needs the same set of information after the predetermined time interval, it sends a request to the social networking system even if it has a previously stored response to the request. This ensures that the external system receives the latest information and privacy settings available at the social networking system. For example, if the privacy settings of user A in the above example are updated to allow user B to access the profile image of user A, a response to a request from an external system obtained subsequently by the social network provides the updated information. However the change in the privacy settings or the change in any information available from the social networking system may not be reflected in the external system for the predetermined interval of time. For example, if the predetermined interval of time is 24 hours and the privacy settings of user B were updated soon after the external system fetched the profile images of the friends of user B, for 24 hours the user B may not be able to see the profile image of user A, even though user A has granted user B permission to view user A's profile image.

An embodiment alleviates the problem of the delay in propagation of changes from social networking system to external system by causing the social networking system to actively inform the external system in response to any updates to privacy settings or information of the social networking system that may affect data stored at the external system. For example, in response to the user A updating the profile settings allowing user B to view user A's profile image, the social networking system sends a message to the external system that has recently fetched the profile images of the friends of user A, requesting the external system to invalidate the data returned in the corresponding response. The external system sends a request to the social networking system if the corresponding data is needed by the external system. Accordingly, the external system may get the information from the social networking system that reflects the latest privacy settings much earlier than the predetermined time interval used by the external system for automatically invalidating its social network data.

In one embodiment, the latest privacy settings are sent to the external systems that are likely to use the information periodically. For example, a predetermined schedule is used to push privacy settings information to external systems. The privacy settings information may be pushed to the external system based on the predetermined schedule irrespective of whether any request is received from the external system and irrespective of any changes to the privacy settings.

System Architecture

FIG. 1 is a high level block diagram illustrating a system environment suitable for operation of a social networking system 120. The system environment comprises one or more client devices 105, one or more external systems 115, a social networking system 120, and a network 110. In alternative configurations, different and/or additional modules can be included in the system.

The client devices 105 comprise one or more computing devices that can receive user input and can transmit and receive data via the network 110. For example, the client devices 105 may be desktop computers, laptop computers, smart phones, personal digital assistants (PDAs), or any other device including computing functionality and data communication capabilities. The client devices 105 are configured to communicate via network 110, which may comprise any combination of local area and/or wide area networks, using both wired and wireless communication systems.

FIG. 1 contains a block diagram of the social networking system 120. The social networking system 120 includes a web server 150, an API request server 170, an authorization server 145, an external system information manager 155, a user profile store 160, and a connection store 165. FIG. 1 also contains a block diagram of the external system 115. The external system 115 includes a web server 125, a content store 130, a user accounts store 135, a social network information manager 175, and a social network data store 140. In other embodiments, the social networking system 120 or the external system 115 may include additional, fewer, or different modules for various applications. Conventional components such as network interfaces, security mechanisms, load balancers, failover servers, management and network operations consoles, and the like are not shown so as to not obscure the details of the system.

The social networking system 120 comprises a computing system that allows users to communicate or otherwise interact with each other and access content as described herein. The social networking system 120 stores user profiles that describe the users of a social networking system, including biographic, demographic, and other types of descriptive information, such as work experience, educational history, hobbies or preferences, location, and the like. The social networking system 120 further stores data describing one or more connections between different users in the connection store 165. The connection information may indicate users who have similar or common work experience, group memberships, hobbies, or educational history. Additionally, the social networking system 120 includes user-defined connections between different users, allowing users to specify their relationships with other users. For example, these user-defined connections allows users to generate relationships with other users that parallel the users' real-life relationships, such as friends, co-workers, partners, and so forth. Members may select from predefined types of connections, or define their own connection types as needed.

The social networking system 120 stores information related to member actions on and/or off the social networking Any action that a particular member takes with respect to another member is associated with each member's profile, through information maintained in a database or some other data repository. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well.

The web server 150 links the social networking system 120 via the network 110 to one or more client devices 105; the web server 150 serves web pages, as well as other web-related content, such as Java, Flash, XML, and so forth. In some embodiments, the web server may be used for communicating with the external system 115. For example, requests sent by the external system 115 can be received by the web server 150 and processed. The web server 150 may include a mail server or other messaging functionality for receiving and routing messages between the social networking system 120 and the client devices 110. The messages can be instant messages, queued messages (e.g., email), text and SMS messages, or any other suitable messaging technique. Embodiments in which the social networking system 120 is a website, the web requests are received by the web server 125. However, in other embodiments, the input requests may be received by other modules, for example, the API request server 170.

The API request server 170 allows external websites 200 to access information from the social networking system 120 by calling APIs. The API request server 170 may also allow external systems 115 to send information to social networking website by calling APIs 160. An external system 115 sends an API request to the social networking system 120 via the network 110. The API request is received at the social networking website by the API request server 170. The API request server processes the request by calling the appropriate program code to collect any appropriate response, which is then communicated back to the external system 115 via the network 110.

The authorization server 145 enforces the privacy settings of the users of the social networking system. The privacy setting of a user determines how particular information associated with a user can be accessed. The privacy setting comprises the specification of particular information associated with a user and the specification of the entity or entities with which the information can be shared. The entities with which information can be shared may include other users, applications, external systems, or any entity that can potentially access the information. The information that can be shared by a user comprises user profile information like profile photo, phone numbers associated with the user, user's connections, actions taken by the user such as adding a connection, changing user profile information and virtually any other information about the users actions or interactions on or associated with the social networking system or external systems.

The privacy setting specification may be provided at different levels of granularity. For example, the information to be shared may be specific information, such as, work phone number, or a set of related information, such as, personal information including several pieces of related information including profile photo, home phone number, and status. Alternatively, the privacy setting may apply to all the information associated with the user. The specification of the set of entities that can access particular information can also be specified at various levels of granularity. Sets of entities with which information can be shared may include, for example, all friends of the user, all friends of friends, all applications, or all external systems. One embodiment allows the specification to comprise an enumeration of entities, for example, the user may provide a list of external systems that are allowed to access certain information. Another embodiment allows the specification to comprise a set of entities along with exceptions that are not allowed to access the information. For example, a user of a social networking system may allow all external systems to access the user's work information but specify a list of external systems that are not allowed to access the work information. Certain embodiments call the list of exceptions that are not allowed to access certain information a "block list." External systems belonging to a block list specified by a user of a social networking system are blocked from accessing the information specified in the privacy setting. Note that various combinations of granularity of specification of information and granularity of specification of entities with which information may be shared are possible, i.e., all personal information may be shared with friends, whereas all work information may be shared with friends of friends. Systems and methods for allowing an external system to access information in a social networking system using APIs that enforce privacy settings defined in the social networking system are disclosed in U.S. application Ser. No. 12/324,761, filed Nov. 26, 2008, which is incorporated by reference in its entirety. Systems and methods for allowing users to control accessibility of content in a social networking system is disclosed in U.S. application Ser. No. 12/485,856 filed on Jun. 16, 2009, which is incorporated by reference in its entirety. Systems and methods for providing privacy settings for applications associated with a user profile are disclosed in application Ser. No. 12/154,886 filed on May 27, 2008, which is incorporated by reference in its entirety.

Figure 2:
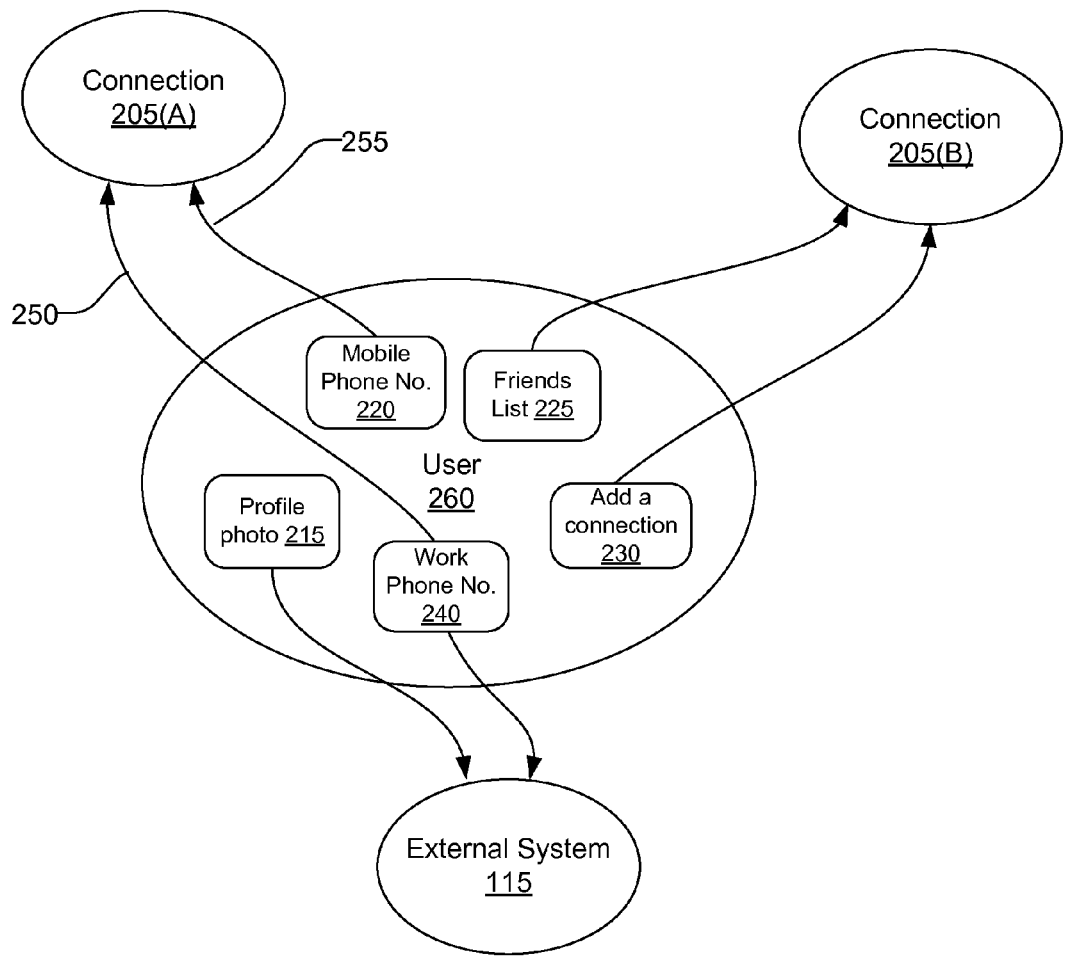
FIG. 2 is an example diagram of privacy settings of a user of a social networking system, in accordance with one embodiment of the invention.

FIG. 2 illustrates an example of how the privacy settings of a user 260 of a social networking system control the accessibility of information associated with the user 260 to the user's connections 205 or to external systems 210. The privacy settings can be defined for specific applications running either on the social networking system 120 or on external systems 115. As shown in FIG. 2, the arrow 250 indicates that connection 205(A) is allowed to access the work phone number 240 of user 260, and arrow 255 indicates that connection 205(A) is allowed to access the mobile phone number of the user 260. Connection 205(A) does not have access to information such as profile photo 215 of the user 260 or the user's friends list 225. On the other hand, connection 205(B) is allowed to access the user's friends list 225. The information associated with a user includes actions taken by a user, such as the action of adding a new connection 230. The user 260 can completely block another user, application or external system from accessing any information associated with the user 260. A user or an application that is blocked by the user 260 does not have access to any information associated with user 260.

The external system information manager 155 manages social network data that may be stored in external systems. For example, if privacy settings of a user are updated, the external system information manager 155 sends request to external systems to invalidate the related information that may be stored in the external systems. In an embodiment, the external system information manager 155 keeps data structures to track the external systems that accessed information from the social networking system 120 and the time when the information was accessed. The external system information manager 155 determines the information to be sent to the external system 115 to invalidate social network data stored at the external system 115. For example, the external system information manager 155 may send a list of users to the external system 115 in order to invalidate information of those users. The external system information manager 155 may also send to an external system 115, details of specific information that needs to be invalidated for a user.

The authorization server 145 contains logic to determine if certain information associated with a user of a social networking system can be accessed by a user's friends and/or other applications, entities or external systems. For example, an external system 115 that attempts to access a user's work phone number 240 must get authorization to access the information from the authorization server 145. The authorization server 145 decides, based on the user's privacy settings, if the user's work phone number 240 can be accessed by the external system 115. Based on the user's privacy settings, the authorization server 145 decides if the external system 115 is allowed to access information associated with the user 260.

As discussed above, the social networking system 120 maintains data about objects with which a user may interact in the social networking system 120. To this end, the user profile store 250 and the connection store 165 store instances of the corresponding type of objects maintained by the social networking system 120. Each object type has information fields that are suitable for storing information appropriate to the type of object. For example, the user profile store 160 contains data structures with fields suitable for describing a user's profile. When a new object of a particular type is created, the social networking system 120 initializes a new data structure of the corresponding type, assigns a unique object identifier to it, and begins to add data to the object as needed. This might occur, for example, when a user becomes a user of the social networking system 120, the social networking system 120 generates a new instance of a user profile in the user profile store 160, assigns a unique identifier to the user profile, and begins to populate the fields of the user profile with information provided by the user.

The web server 125 of the external system 115 links the external system 115 via the network 110 to one or more client devices 105; the web server 150 serves web pages, as well as other web-related content, such as Java, Flash, XML, and so forth. The content presented to the client device 105 is stored in the content store 130. In some embodiments, the web server 125 may be used for interacting with the social networking system. For example, requests and responses sent by the social networking system 120 can be received by the web server 125 for processing. Embodiments in which the external system is a website, the web requests are received by the web server 125. However, in other embodiments, the input requests may be received by other modules, for example, the API request server 170.

The external system 115 maintains a user accounts store 135 to maintain data associated with accounts of users of the external system 115. The user accounts store 135 may store information associated with a user including user name and password as well as other information relevant to the external system 115, for example, email address, mailing address, and billing information. In some embodiments, the external system 115 can also store information including actions or interests of the user.

The social network information manager 174 coordinates interactions with the social networking system 120 in order to obtain social network information from the social networking system 120. The social network information manager 174 uses the APIs provided by or associated with the social networking system 120 for obtaining social network information. The social network information manager 174 processes messages sent by the social networking system, for example, messages requesting the external system 115 to invalidate certain social network information. The information obtained by the external system 115 from the social networking system 120 is stored in the social network information store 140. The social network information store 140 also contains information regarding the time that the data was retrieved from the social networking system 120. The time of retrieval of data is used to determine the time that has elapsed since the data was obtained from the social networking system 120. The social network information manager 174 can invalidate data available in the social network information store 140 if a predetermined amount of time has elapsed since the data was obtained from the social networking system 120. The social network information manager 174 may determine whether to use the data stored in the social network information store 140 or to refresh the data by sending a request to the social networking system 120.

Figure 3:
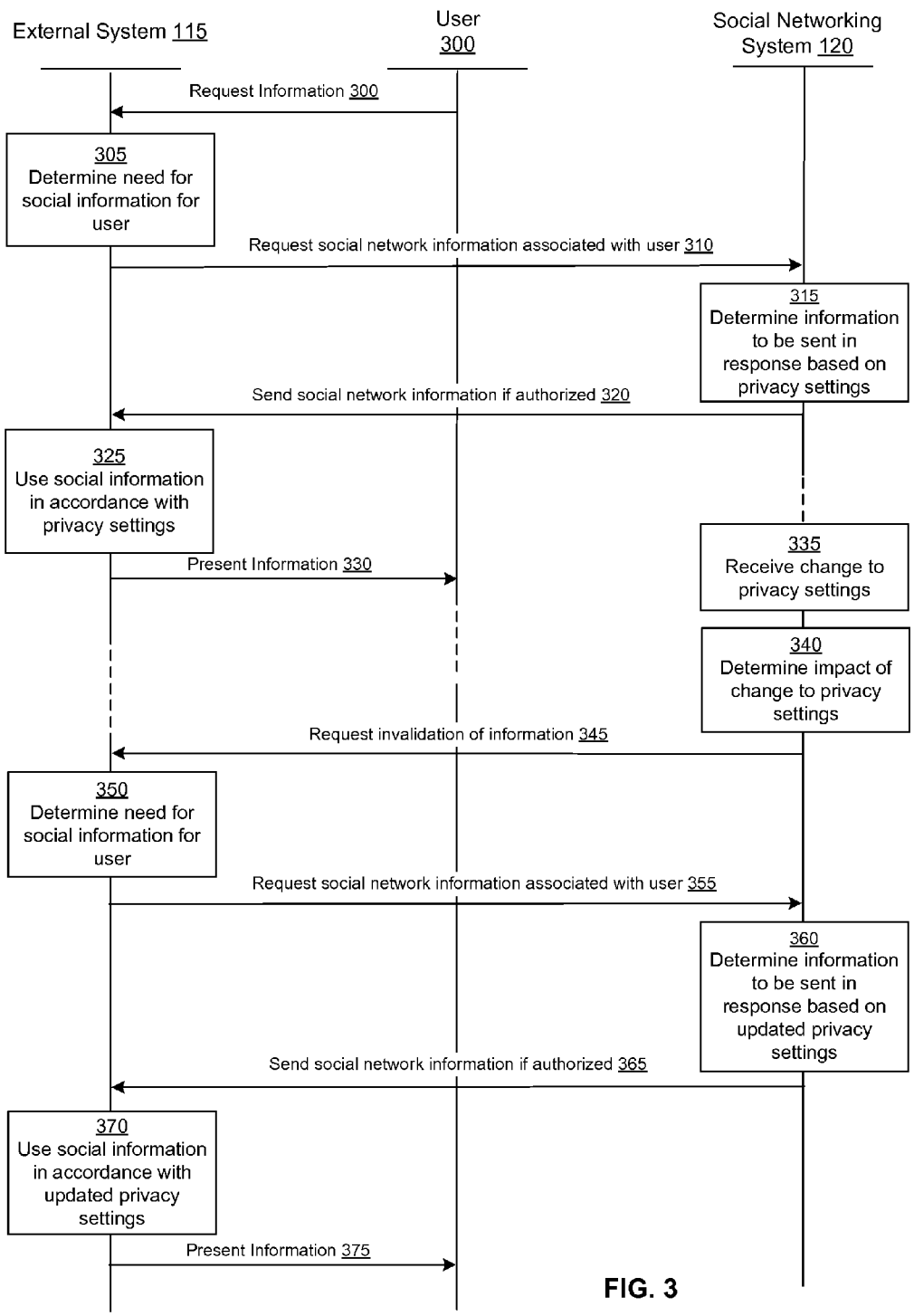
FIG. 3 is an interaction diagram of a process in which the social networking system actively invalidates information in an external system in response to changes to privacy settings, in accordance with one embodiment of the invention.

Enforcement of Privacy Settings of Social Networking System in an External System FIG. 3 shows a process by which external system 115 accesses information associated with a user 300 from a social networking system 120 and illustrates how changes to the privacy settings of the user are propagated to the external system 115. A user of the social networking system 120 becomes a user 300 of the external system 115 by either creating an account on the external system 115 or by simply interacting with the external system 115. The process of FIG. 3 starts with a user 300 of the external system 115 requesting 300 information from the external system 115. The request 300 is received by the web server 125. FIG. 3 does not show certain steps that may happen before the user's request 300 to the external system 115. For example, the user 300 may login to the external system 115 and take other actions before invoking the process that results in the requesting 300 of information from the external system 115. In certain embodiments, the interaction 300 may correspond to the user taking any type of action on the external system 115. To respond to the user's request, or to present the user with information that may be of interest to the user, the external system 115 determines 305 a need for information from the social networking system 120, related to the user 300. For example, a user may interact with a website for donating to a charity. The website may want to present to the user, a list of the user's friends that have donated at the website. Determining the list of user's friends requires the website to interact with the social networking system 120.

The social network information manager 175 of the external system 115 requests 310 information associated with user 300 from the social networking system 120. The external system 115 may or may not have the information regarding whether the user 300 is a user of the social networking system 120. In case the external system 115 does not have information about whether the user 300 is a user of the social networking system 120, the external system 115 may request the membership status of the user 300 in the social networking system 120. If the external system 115 has the information that the user 300 is a user of the social networking system 120, the external system 115 may request further information related to user 300 from the social networking system 120. The additional information requested may comprise details of the user profile (including the users actions and interactions within and outside the social networking system) of the user or information related to the user's connections in the social networking system 120.

As part of the request 310, the social network information manager 175 of the external system 115 may present information associated with the user 300 that helps the social networking system 120 identify the user as a user of the social networking system 120. The information presented by the external system 115 for identifying user 300 may depend on previous communications between the external system 115 and the social networking system 120 regarding the user 300. For example, if the external system 115 has previously communicated with the social networking system 120 regarding user 300, the social network information manager 175 may send a unique identifier associated with the user of the external system 120, which may then be used to identify the corresponding user of a social networking system uniquely. If this is the first request sent by the external system 115 to the social networking system 120 regarding the user 300, the social network information manager 175 may send information useful for identifying the user 300. In one embodiment, the social network information manager 175 may uniquely identify the user 300 by sending information that it maintains for the user 300, such as the user's full name, email address, home phone number, date of birth, or any other identifying information, alone or in combination. In one embodiment, the client device checks a session cookie associated with the social networking system 130 on the client device that indicates that the user is a member of the social networking system. Certain information associated with the user's account on the social networking system may be determined using session cookies set by the social networking system on the client device, for example, the user's login name. In another embodiment, the information gathered from the session cookies set by the social networking system is treated as preliminary information subject to further authentication and verification. For example, even though a session cookie may indicate that the user is a member of the social networking system, the user may be required to authenticate with a password to be able to access information from the social network system. Similarly, even though the session cookie may provide the login name of the user for the social networking system, further verification may be performed by sending a request to the social networking system since it is possible that the session cookies on the client device represent outdated information.

Once the request 310 is received by the API request server 170 of the social networking system 120, in certain embodiments, the API request server 170 checks the user profile store 160 to determine whether the identification information presented with the request matches a user of the social networking system 120. If the identification information matches a user of the social networking system 120, the API request server 170 communicates with the authorization server 145 determine 315 the information to be returned to the external system 115 in response to the request 310. If the requested information is associated with multiple users of the social networking system, the privacy settings of all the users involved are checked to compute the subset of information that the external system 115 is authorized to access. In one embodiment, the information returned to the external system 115 includes only the subset of information that the external system 115 is authorized to access based on the privacy settings of all the users whose information is requested. A user of a social networking system 120 who is not allowed to access certain information in the social networking system 120 is not allowed to access the same information when the social network information is presented to the user in an external system 115.

If the external system 115 is authorized to access the requested information, API request server 170 of the social networking system 120 replies 320 to the external system's request 310 with the requested information. The processes of requesting 310, determining 315 a response, and replying 320 may repeat several times, until the external system 115 has obtained the information that it needs for its own purposes. In an embodiment, the external system 115 then presents 330 this combined information to the user 300. In another embodiment, the social network information is processed and combined with information available in the external system and sends the combined information to the client device 110. In another embodiment, information obtained from the social networking system is not sent to the client device but instead used for processing to determine information that may be subsequently displayed to the user. In another embodiment, social networking system information may be used to determine whether specific content from the external system is displayed to the user or not. For example, the age of a user obtained from the social network may be used to determine if specific content can be displayed to the user or not. Alternatively, activities performed by the user in the social networking system may be used to determine the content displayed to the user. For example, a member active in particular social groups may be displayed content determined based on the members activities.

In an embodiment, instead of determining 315 a subset of the information based on the privacy settings, the API request server 170 of the social networking system 120 sends the relevant information needed to compute the subset along with the privacy settings information to the external system 115 in the reply 320. The external system 115 ensures that the privacy settings are enforced when using the data and uses 325 the social network information accordingly. The external system 115 needs knowledge of how to enforce privacy settings of the social networking system 120. In contrast, if the social networking system 120 computes the subset of information to be presented to the external system 115 based on privacy settings of the users of the social networking system, the external system 115 is not required to know how to enforce privacy settings.

The social networking system 120 may receive 335 an update to the privacy settings relevant to the user 300. The update may be in response to the user 300 changing the privacy settings of the user 300. For example, the user 300 may disallow the external system 115 from obtaining the status information of user 300 or the user 300 may allow the external system 115 access to certain information previously not accessible to the external system 115. Alternatively, a connection of the user can change the connection's privacy settings, thereby changing the information that the user 300 is allowed to access. For example, if the user 300 was previously allowed to see the profile image of a connection, the connection can change the privacy settings to disallow user 300 from accessing the connection's profile image. The change affects the set of all profile images of connections that are accessible to the user 300. A user can make changes to privacy settings affecting a specific user or to a set of users. For example, the user can make a change to a privacy setting applicable to a set of users listed with the change. Alternatively, a user can make changes to privacy settings affecting all the connections of the user. For example, a user can make the user's profile image inaccessible to all connections. In another embodiment, a user can make changes to privacy settings affecting all friends of friends. For example, a user can make the user's profile image accessible to all friends of the user as well as to all friends of friends of the user. A user can make a change to the privacy settings applicable to one or more external systems, thereby allowing or disallowing one or more external systems from accessing some information. A user can also make a change to the privacy settings applicable to one or more applications that may be running on the social networking system or on an external system.

Based on the scope of the change to the privacy settings, the external system information manager 155 of the social networking system determines 340 the impact of the change in terms of the various external systems affected by the change. For example, the external system information manager 155 may determine all the users affected by a change to privacy settings and determine all the external systems that need to be informed of the change to privacy settings. In an embodiment, the external system information manager 155 always sends a request to all external systems that access data from the social networking system to invalidate related data stored in the external systems. Accordingly, external systems that do not have any locally stored information that is affected by the changes to the privacy settings may also be informed of the change. As a result more requests 345 may be sent by the social networking system 120 than necessary.

In one embodiment, instead of sending 345 a message to invalidate information cached in the external system, the changes to the privacy settings are communicated to the external system. Accordingly, the external system receives the required information instead of having to send a subsequent request for information. However, the amount of data transferred to the external system in communicating the changed privacy settings may be more than the data communicated in a message that only invalidates information. This may cause higher communication overhead. Furthermore, it is possible that the external system never uses the privacy settings information communicated to the external system since the information was not communicated in response to a request but pushed to the external system. However in this embodiment, the external system receives the updated information as soon as changes occur to the privacy settings. The external system receiving the updated privacy settings information may be external systems that have previously requested the information or the information may be broadcast to all external systems.

In another embodiment, the external system information manager 155 tracks the users of the external systems that are users of the social networking system 120. The external system information manager 155 sends 345 the request only to external systems that have at least one user that is a user of the social networking system 120 who is affected by the change 335 to the privacy settings. For example, if none of the users who are users of the social networking system 120 are affected by a change 335 to the privacy settings, there is no need to request 345 invalidation of information at the external system 115 since the external system 115 has no reason to locally store data related to the users of the social networking system affected by the change 335 to the privacy settings.

In another embodiment, the external system information manager 155 tracks the information that it sends 320 to external systems. The external system information manager 155 needs to request 345 invalidation of information at the external system 115 only if the external system 115 was previously sent 320 information affected by a change 335 of privacy settings. For example, the external system 115 may have users that are users of the social networking system 120 affected by the privacy settings change 335, but if the external system 115 was never sent 320 any information affected by the change 335 of privacy settings, there is no reason to request 345 invalidation of information. In an embodiment, there is an agreement between the external system 115 and the social networking system 120 requiring the external system 115 to automatically invalidate any information sent 320 by the social networking system 120 after a predetermined interval of time, for example, 24 hours. The external system information manager 155 sends 345 requests for invalidation of information to an external system 115 if the social networking system 120 sent 320 any information affected by the change 335 of privacy settings within the predetermined time interval. If the predetermined time interval for the information affected by the change 335 of privacy settings has already expired, there is no need to request 345 invalidation of the information, because the external system 115 invalidates the information automatically based on the agreement with the social networking system.

There can be different levels of granularity of information that are invalidated by the request 345. In an embodiment, the request 345 invalidates all the social network information stored in the external system. Accordingly, if the external system 115 subsequently determines 350 a need for social network information, it has to send a request 355 for information to the social networking system 120. In another embodiment, the external system information manager 155 sends a list of users of the external system 115 with request 345. The external system 115 invalidates all the information locally stored for the users in the list of users. If the external system 115 has locally stored information about users not affected by the change 335 to privacy settings, there is no need to invalidate that information since it is not affected by the change 335 to the privacy settings. In another embodiment, the external system information manager 155 sends 345 a list of users and the information to be invalidated for each user. This is useful if the amount of data stored for a user is large and requires significant amount of time to transfer from the social networking system 120. For example, if the external system 115 has locally stored images of a user 300, and the user updates privacy settings related to status of the user, there is no need to invalidate the images of the users stored in the external system 115. Invalidation of all the information stored for user 300 may require transfer of large amount of data that was not specifically affected by the change 335 to the privacy settings.

In response to request 355, the social networking system 120 determines 360, based on the updated privacy settings, the information that needs to be sent to the external system 115. The social networking system 120 replies with information based on privacy settings. In alternative embodiments, the social networking system 120 replies with the details of the updated privacy settings along with the information and users affected by the change 335 to the privacy settings, allowing the external system 115 to apply the privacy settings. The external system 115 uses 370 the information in accordance with the updated privacy settings.

Figure 4:
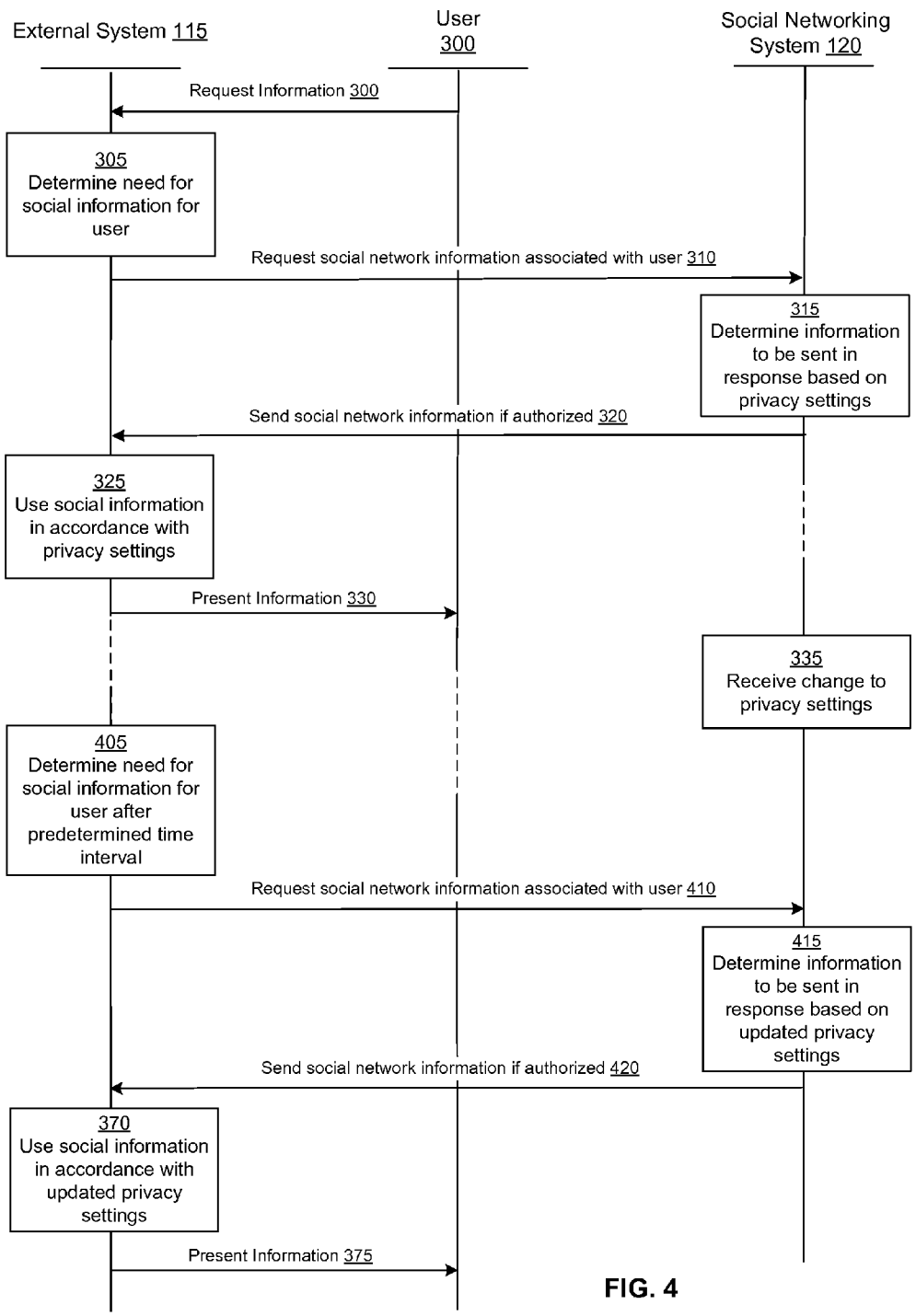
FIG. 4 is an interaction diagram of a process in which an external system refreshes information obtained from a social networking system after a pre-determined time interval in order to enforce updates to privacy settings, in accordance with one embodiment of the invention.

FIG. 4 shows an interaction diagram of a process in which the external system 115 enforces updates to privacy settings by refreshing information obtained from a social networking system 120 after a pre-determined time interval. As compared to the embodiment disclosed in FIG. 3, the embodiment in FIG. 4 does not require the social networking system 120 to send a message requesting 345 invalidation of information in response to changes 335 in privacy settings. The initial interactions shown in FIG. 4 are similar to those shown in FIG. 3. As shown in FIG. 4, user 300 requests 300 information from the external system 115 and the external system 115 determines a need for social information 305 and requests 310 information from the social networking system 120. The social networking system 120 determines 315 the subset of information to be sent to the external system 115 and replies 320 with the information. The external system 115 uses the 325 information received.

As shown in FIG. 4, in response to changes 335 in privacy settings the social networking system 120 does not send a request to the external system 115 to invalidate information. Instead, the external system 115 has an agreement with the social networking system 120 requiring the external system 115 to invalidate information received from the social networking system 120 after a predetermined interval of time since the receipt of the information. If the external system 115 needs social network information, the social network information manager 175 checks the social network information store 140 to determine if the information is already available locally. If the information required is available in the social network information store 140, the social network information manager 175 checks if the information was retrieved from the social networking system 120 within the predetermined interval of time. If the information was not retrieved within the predetermined interval of time, the external system may expunge the social network information received previously. If the external system 115 needs the social network information after the predetermined interval of time, the external system 115 refreshes the required information by requesting 410 required information from the social networking system 120. The social networking system 120 determines the subset of the information to be sent to the external system 115 based on the updated privacy settings and replies 420 with the information. The external system 115 uses 370 the information in accordance with the updated privacy settings.

In one embodiment, the privacy settings may be classified into privacy settings that need to be updated in external systems immediately and privacy settings that don't need to be updated in external systems immediately. For updates to privacy settings that need to be updated in external systems immediately, the social networking system 120 sends a request to the external system 115 to invalidate the associated information in response to changes to the privacy settings. For privacy settings that do not require an immediate update, the social networking system waits for the external system 115 to send a request after the information in the external system 115 is automatically invalidated by the external system 115 after a predetermined time interval from receipt of the information.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:

interacting, by an external system, with a subject user of a social networking system, wherein the social networking system maintains for each of a plurality of users, a user account, social connections of the user, and information describing actions performed by the user;

sending a request by the external system to the social networking system for social network information associated with the subject user, the social network information comprising information associated with the user stored in the social networking system, the external system configured to provide an online service to the subject user;

establishing, by the external system with the social networking system, a predetermined time period during which the external system is allowed to use the social network information associated with the subject user of the social networking system and shared by the social networking system with the external system;

receiving, by the external system, a response from the social networking system, the response comprising information responsive to the request for information and one or more privacy settings governing the use of the information, the one or more privacy settings selected by the subject user and specifying rules for access to social network information associated with the subject user, each rule determining whether one or more items of the social network information associated with the subject user are available to one or more other users of the plurality of users;

using, by the external system, the information from the received response in accordance with the one or more privacy settings; and responsive to receiving the social network information associated with the subject user, deleting, by the external system, after the predetermined time period, at least a portion of the information associated with the subject user received from the social networking system.

2. The computer implemented method of claim 1, wherein the response from the social networking system comprises information associated with the subject user.

3. The computer implemented method of claim 1, wherein the response from the social networking system comprises information associated with the subject user, and wherein the social networking system requires use of the information associated with the subject user by the external system to be subject to the one or more privacy settings.

4. The computer implemented method of claim 1, further comprising:
responsive to the social networking system updating the one or more privacy settings for the subject user, receiving one or more of the updated privacy settings, the one or more updated privacy settings conveyed as a request from the social networking system to cease using the information in the received response.

5. The computer implemented method of claim 1, wherein the information associated with the subject user comprises information unaffected by any change in the one or more privacy settings, and wherein the information unaffected by any change in the one or more privacy settings is not deleted after the predetermined time period.

6. The computer implemented method of claim 1, further comprising:
responsive to the social networking system updating the one or more privacy settings to change one or more of the rules for access to the social network information associated with the subject user, receiving one or more of the updated privacy settings from the social networking system with instructions to enforce the updated privacy settings.

7. The computer implemented method of claim 6, wherein the updated privacy settings are responsive to a request from the subject user to update privacy settings associated with the subject user.

8. The computer implemented method of claim 6, wherein the updated privacy settings are responsive to a request from another user connected to the subject user via the social networking system to update privacy settings associated with the other user.

9. The computer implemented method of claim 6, wherein the instructions include enforcing the updated privacy settings before the predetermined time period has lapsed.

10. The computer implemented method of claim 1, further comprising:
responsive to needing the social network information after the predetermined period of time has lapsed, sending a second request to the social networking system for social network information associated with the subject user.

11. A non-transitory computer-readable storage medium storing instructions, the instructions when executed by a processor causing the processor to:
interact, by an external system, with a subject user of a social networking system, wherein the social networking system maintains a user account for each of a plurality of users, a user account, social connections of the user, and information describing actions performed by the user;
send, by the external system, a request to the social networking system for social network information associated with the subject user, the social network information comprising information associated with the user stored in the social networking system, the external system configured to provide an online service to the subject user;
establish, by the external system with the social networking system, a predetermined time period during which the external system is allowed to use the social network information associated with the subject user of the social networking system and shared by the social networking system with the external system;
receive a response from the social networking system, the response comprising information responsive to the request for information and one or more privacy settings governing the use of the information, the one or more privacy settings selected by the subject user and specifying rules for access to social network information associated with the subject user, each rule determining whether one or more items of the social network information associated with the subject user are available to one or more other users of the plurality of users;
use the information from the received response in accordance with the one or more privacy settings; and
responsive to receiving the social network information associated with the subject user, delete, after the predetermined time period, at least a portion of the information associated with the subject user received from the social networking system.

12. The non-transitory computer-readable storage medium of claim 11, wherein the response from the social networking system comprises information associated with the subject user.

13. The non-transitory computer-readable storage medium of claim 11, wherein the response from the social networking system comprises information associated with the subject user, and wherein the social networking system requires use of the information associated with the subject user by the external system to be subject to the one or more privacy settings.

14. The non-transitory computer-readable storage medium of claim 11, the instructions further causing the processor to:
responsive to the social networking system updating the one or more privacy settings for the subject user, receive one or more of the updated privacy settings, the one or more updated privacy settings conveyed as a request from the social networking system to cease using the information in the received response.

15. The non-transitory computer-readable storage medium of claim 11, wherein the information associated with the subject user comprises information unaffected by any change in the one or more privacy settings, and wherein the information unaffected by any change in the one or more privacy settings is not deleted after the predetermined time period.

16. The non-transitory computer-readable storage medium of claim 11, the instructions further causing the processor to:
responsive to the social networking system updating the one or more privacy settings to change one or more of the rules for access to the social network information associated with the subject user, receive one or more of the updated privacy settings from the social networking system with instructions to enforce the updated privacy settings.

17. The non-transitory computer-readable storage medium of claim 16, wherein the updated privacy settings are responsive to a request from the subject user to update privacy settings associated with the subject user.

18. The non-transitory computer-readable storage medium of claim 16, wherein the updated privacy settings are responsive to a request from another user connected to the subject user via the social networking system to update privacy settings associated with the other user.

19. The non-transitory computer-readable storage medium of claim 16, wherein the instructions include enforcing the updated privacy settings before the predetermined time period has lapsed.

20. The non-transitory computer-readable storage medium of claim 11, the instructions further causing the processor to:
- responsive to needing the social network information after the predetermined period of time has lapsed, send a second request to the social networking system for social network information associated with the subject user.

* * * * *